United States Patent Office 3,549,639
Patented Dec. 22, 1970

3,549,639
SYDNONE CHELATES
Stuart M. Lee, Orange, Calif., assignor to North American Rockwell Corporation
No Drawing. Filed Aug. 30, 1967, Ser. No. 664,294
Int. Cl. C07d 31/42
U.S. Cl. 260—270
4 Claims

ABSTRACT OF THE DISCLOSURE

The sydnone chelate, useful as an intermediary for cross linked polymers or as a pigment, and having the general formula

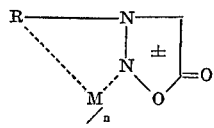

wherein R is a heterocyclic, M is a metal, and $n=2$ or 3. Such sydnone chelates may be prepared by reacting a sydnone of the general form

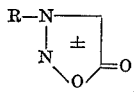

wherein R is a heterocyclic, with a compound of the form $MX_n$, where M is a metal, X is an anion, and $n=2$ or 3.

BACKGROUND OF THE INVENTION

(1) Field of the invention

The present invention relates to sydnone chelates and methods for synthesizing them. More specifically, the invention relates to sydnone chelates useful as pigments or as intermediates for high-temperature cross linked sydnone polymers.

(2) Description of the prior art

The present invention sets forth a new series of sydnone chelates useful as pigments or an intermediates for high temperature cross linked polymers. These new materials are based on sydnone chelates including the sydnone moiety (I), a quasi-aromatic or "mesoionic," nitrogen-containing cyclic structure.

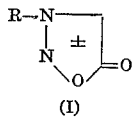

(I)

The name "sydnone" is derived from that of the University of Sydney, where the compounds first were discovered in 1935. In general, the sydnones form a class of anhydro compounds obtained by the action of certain dehydrating agents, notably acetic anhydride, on the N-nitroso derivatives of N-substituted α-amino acids.

As described in the article entitled "The Chemistry of the Sydnones" by F. H. C. Stewart, beginning on page 129, Chemical Reviews, June 1964, the sydnones (I) are organic compounds containing an unusual heterocyclic ring system. This 5-membered ring system, containing three heteroatoms, cannot accurately be represented as a single covalent structure, since such a structure does not concur with the observed reactivity of the sydnones. Rather, an abundance of evidence of sydnone ionic-type interaction indicates that if the structures (I) are not ionic, they must at least show a strong predisposition towards ionization under appropriate circumstances.

The quasi-aromatic or "mesoionic" nature of the sydnone, as illustrated by the ± symbolism, represents the hybrid form of the canonical structures, some of which bear a negative charge on the exocyclic oxygen (II) and some on the ring atoms (III). Alternately viewed, this "mesoionic" configuration allows one nitrogen atom in (I) to have only two formal bonds and the oxygen to have but three.

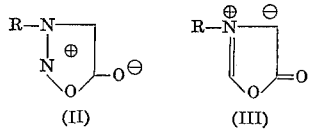

(II)          (III)

As reported by Stewart (pages 135 and 137, op. cit.) a number of disydnones have been synthesized in the past. These include the 3,3′-polymethylenedisydnone (IV) and a 4-acetomercuricdisydnone (V).

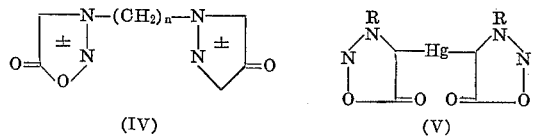

(IV)          (V)

However, prior to the present invention, chelation of sydnones has not been achieved.

Chelation may be defined as the equilibrium reaction between a metal ion and a complexing agent, characterized by the formation of more than one bond between the metal and a molecule of the complexing agent, and resulting in the formation of a ring structure incorporating the metal ion. Note that a metal ion possesses reactive sites at which the activity of the metal is centered. In a chelate, reaction of the metal ion is inhibited by providing one or more molecules of a complexing agent, wherein each molecule coordinates with more than one reactive site of the metal ion. When all of the reactive sites of the ion are so coordinated with the complexing agent, the metal is said to be chelated. An excellent introduction to chelates is contained in the book entitled "Chemistry of the Metal Chelate Compounds" by R. E. Martell and M. Calvin, published by Prentice-Hall, New York, 1953.

The present invention provides a sydnone chelate useful as a pigment or as an intermediate for high temperature materials.

SUMMARY OF THE INVENTION

In accordance with the present invention, there is set forth a material comprising a sydnone chelate useful as a pigment or as an intermediate for high temperature materials. The inventive chelates are of the general form (VI) wherein R is a heterocyclic, M is a metal, and $n=2$ if M is divalent, $n=3$ if M is trivalent.

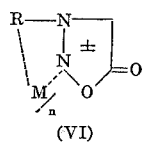

(VI)

The inventive sydnone chelates typically may be synthesized by first preparing a sydnone of the general form (VII)

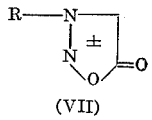

(VII)

wherein R is a heterocyclic. Subsequently, the heterocyclic sydnone (VII) is reacted with a compound of the general form $MX_n$, wherein M is a metal, X is an anion, and $n=2, 3$; this produces the chelate polymer (VI).

Thus, it is an object of the present invention to provide a sydnone chelate.

Another object of the present invention is to provide a sydnone chelate of the general form

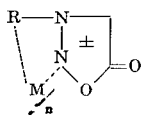

Yet another object of the present invention is to provide a method for preparing sydnone chelates.

A further object of the present invention is to provide a high temperature, chelate-cross-linked sydnone polymer.

These and other objects and features of the present invention will become clear in conjunction with the following description of the preferred embodiments which are illustrative of the present invention.

DESCRIPTION OF THE PREFERRED EMBODIMENTS

The invention sydnone chelate materials, useful as pigments or as intermediaries for high temperature materials, have the general form (VI)

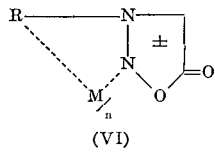

(VI)

wherein R is heterocyclic, M is a metal, and N=2 or 3. The sydnone chelate (VI) may be prepared by reaction of a sydnone of the general form (VII) with a compound of the form $MX_n$, where M is a divalent or trivalent metal, X is a negative ion (i.e., anion) and $n=2$ if M is divalent, $n=3$ if M is trivalent. The following reaction is typical:

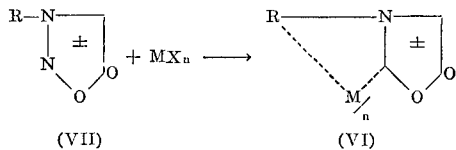

(VII)　　　　　　(VI)

Heterocyclics useful in (VII) include, but are not limited to, nitrogen, sulfur and oxygen heterocyclics. Typically, for example, pyridine rings such as the N-substituted pyridyl may be used advantageously.

The N-substituted pyridyl sydnone (VIII)

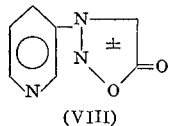

(VIII)

from which a sydnone chelate may be synthesized in accordance with the present invention itself may be prepared by first reacting 3-amino pyridine with aqueous glycolonitrile to form N-(3-pyridyl) hydrochloride (IX). Nitrosation of (IX) forms N-(3-pyridyl)-glycine N-nitroso-N-(3-pyridyl)-glycine (X) which itself may be cyclized to form the pyridyl sydnone (VIII). The equation describing this reaction is shown below.

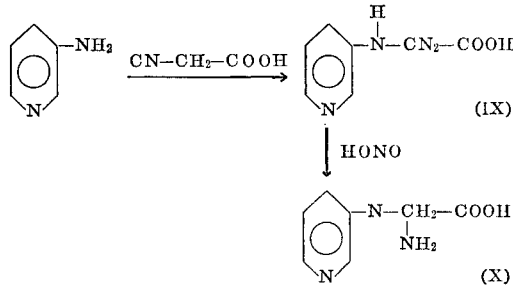

A specific example of how the N-(3-pyridyl) sydnone may be prepared is as follows:

(A) Preparation of N-(3-pyridyl)-glycine hydrochloride (IX)

A solution of 28.2 g (0.30 mole) of 3-aminopyridine and 30.0 g. of 70 percent aqueous glycolonitrile in 80 ml. of water was refluxed for one hour. After cooling to room temperature, concentrated hydrochloric acid (100 ml.) was added. Refluxing was continued for an additional hour and the mixture was cooled, filtered, and washed with concentrated hydrochloric acid and air dried to yield 35.1 g. of the glycine hydrochloride (IX) as tan crystals, M.P. 220–240° C. (lit. 222–225° C).

(B) Nitrosation of N-(3-pyridyl)-glycine hydrochloride (IX)

To a cold (0–5° C.) suspension of 50 g. (0.3 mole) glycine hydrochloride (IX) in 500 ml. of water and 10 ml. of concentrated hydrochloric acid was slowly added 25 g. of sodium nitrite in 60 ml. of water at a rate to maintain the temperature below 5° C. After stirring two hours, the acetic solution was filtered to yield 38.0 g. of the N-nitroso-N-(3 pyridyl)-glycine (X) as pale yellow crystals, M.P. 164–5° C.

(C) Cyclization of N-nitroso-N-(3-pyridyl) glycine (X)

A solution of 10 g. of the previously prepared N-nitrosoglycine (X) in 50 ml. of acetic anhydride was stirred overnight at room temperature. The excess acetic anhydride was removed under reduced pressure and methanol (150 ml.) was added. The solution was evaporated and the product recrystallized from aqueous ethanol to yield 5.5 g. of pale yellow crystals M.P. 122–123° C. (lit. 121° C.) (VIII). The infrared spectra confirmed the sydnone structure band at about 5.75 microns.

Pyridyl sydnone chelates of the general form (XI)

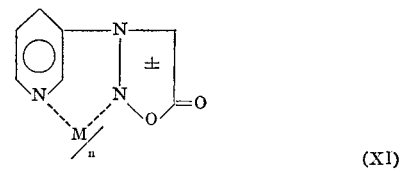

(XI)

wherein M is a metal, and $n=2$ if M is divalent, $n=3$ if M is trivalent, then may be formed from (VIII) in ethanol solution by reaction with an inorganic metal salt. Typical examples are given below:

Example 1.—Preparation of copper pyridyl sydnone chelate

An ethanol solution of pyridyl sydnone (VIII) was reacted at ambient temperature with a solution of $CuBr_2$ in molar ratio of 3 to 1. The precipitated product was recrystallized from ethanol after treatment with Norite. The recrystallization product (XII)

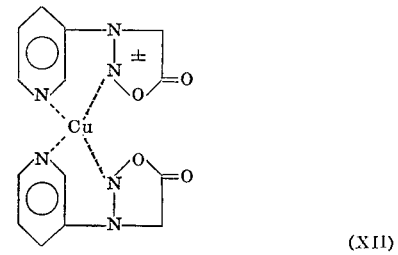

(XII)

exhibited a green color and a melting point of 195° C. Infrared absorption spectographic studies of the material (XII) indicated an absorption band in the 5.75 micron region indicative of a sydnone, as well as absorption bands in the 9.1 and 9.5 micron regions indicative of pyridyl.

Note that in (XII) that the divalent copper ion has two of its reactive sites coordinating with one molecule of the pyridyl sydnone (VIII) and its remaining two reactive sites coordinating with a second pyridyl sydnone (VIII) molecule. That is, the copper is chelated. The two pyridyl sydnones (VIII) play the role of complexing agents, resulting in the formation of a ring structure (XII) incorporating the metal (Cu) ion.

Example 2—Nickel pyridyl sydnone chelate

An ethanol solution of pyridyl sydnone (VIII) was reacted at ambient temperature with a solution of $NiCl_2$ in molar ratio of 3 to 1. The precipitated product was recrystallized from ethanol after treatment with Norite. This precipitated product (XIII) exhibited a tan color and had a decomposition temperature of 295° C. Again, (XIII)

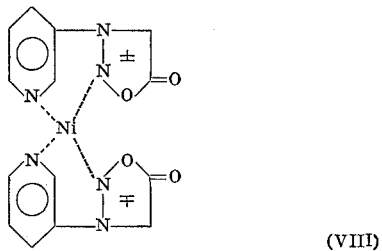

(VIII)

exhibited infrared absorption bands at the 5.75 micron region indicative of syndnone and at the 9.1 and 9.5 micron regions indicative of pyridyl.

An ethanol solution of pyridyl sydnone (VIII) was renickel pyridyl sydnone chelate (XIII) included as complexing agents two pyridyl sydnones (VIII). Two reactive sites of the metal (Ni) ion coordinate respectively with nitrogen sites in the pyridyl and sydnone rings of each (VIII) molecule.

Example 3—Iron pyridyl sydnone chelate

An ethanol solution of pyridyl sydnone (VIII) was reacted at ambient temperature with a solution of $FeCl_3$ in molar ratio of 3 to 1. The precipitated product was recrystallized from ethanol after treatment with Norite. The crystallization product (XIV) exhibited an orange to orange/brown color and had a melting (decomposition) temperature in the range of 250° C. to 260° C. Again, infrared spectrographic absorption bands appeared in the 5.75 micron region (sydnone) and in the 9.1 and 9.5 micron region (pyridyl).

The general formula for the pyridyl sydnone chelate (XIV) is shown below:

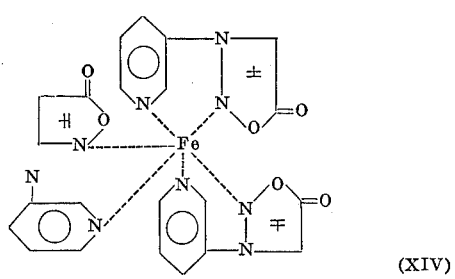

(XIV)

Note in (XIV) that when a trivalent metal (here iron) is chelated, three molecules of the pyridyl sydnone (VIII) are required as complexing agents to coordinate with the six reactive sites of the trivalent (iron) metal.

It should be apparent from the foregoing typical examples that the color of the various sydnone chelates (VI)

formed cover a significant spectral range. This, combined with the fact that the chelates are stable products capable of withstanding significant temperatures, makes them excellent pigments. For example, such sydnone chelate pigments may be used as the coloring agents in a paint.

Yet another application of the sydnone chelates is in the formulation of chelate cross-linked metallo-sydnone oligomers of the general form (XV)

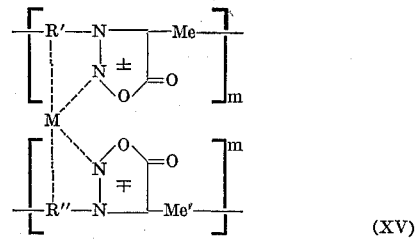

(XV)

wherein R and R' each are heterocyclic, Me and Me' each are divalent metals, and M is a divalent or trivalent metal. Note that in the formulation (XV), M is illustrated as a divalent metal; should M be a trivalent metal, it would chelate with three oligomers rather than the two illustrated. Clearly, (XV) is a highly cross-linked structure.

In general, a chelate sydnone oligomer (XV) may be prepared by reacting with a metal salt a relatively short chain polymer (oligomer) of the general form (XVI).

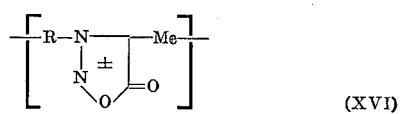

(XVI)

Such polymers disclosed in copending application to Licari and Barnett entitled Metallo-Sydnone Polymers, Ser. No. 661,238 filed in the U.S. Patent Office Aug. 17, 1967, abandoned Mar. 12, 1970, assigned to North American Aviation, Inc., assignee of the present invention Chelate sydnone oligomers (XV) typically exhibit high melting points and are useful, e.g., as a high temperature resistant encapsulation materials for potting electronic or mechanical components.

Although the invention has been described in detail, it is to be understood that the same is by way of illustration and example only, and is not to be taken by way of limitation, the spirit and scope of this invention being limited only by the terms of the appended claims.

I claim:
1. A compound of the formula

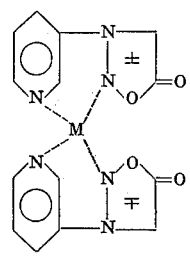

wherein M is selected from the class consisting of Cu, Ni, and Fe.

2. A compound of the formula
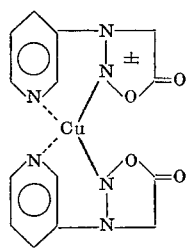
3. A compound of the formula
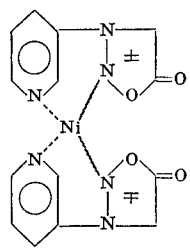
4. A compound of the formula
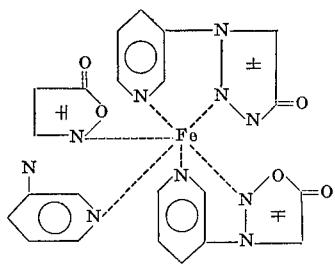
References Cited
Tien et al.: J. Am. Chem. Soc. 77, 6604–5 (1955).
ALEX MAZEL, Primary Examiner
R. V. RUSH, Assistant Examiner
U.S. Cl. X.R.
106—288, 304; 260—2